United States Patent [19]

Little

[11] 4,360,431

[45] Nov. 23, 1982

[54] SELF-UNLOADING CENTRIFUGE

[75] Inventor: Frank Little, Au Gres, Mich.

[73] Assignee: The Harshaw Chemical Company, Cleveland, Ohio

[21] Appl. No.: 259,435

[22] Filed: May 1, 1981

[51] Int. Cl.[3] .......................... B01D 33/06; B04B 3/00

[52] U.S. Cl. .................................. 210/369; 210/380.1

[58] Field of Search ..................... 210/369, 370, 380.1; 68/210

[56] References Cited

U.S. PATENT DOCUMENTS

| | | | |
|---|---|---|---|
| 2,564,443 | 8/1951 | Palotsee | 68/210 |
| 3,199,319 | 8/1965 | Lowes | 68/210 |
| 3,417,582 | 12/1968 | Herty et al. | 68/210 |
| 3,417,583 | 12/1968 | Hutterer | 68/210 |
| 3,498,089 | 3/1970 | Miller et al. | 68/210 |
| 3,677,039 | 7/1972 | Files | 68/210 |

*Primary Examiner*—John Adee

*Attorney, Agent, or Firm*—Watts, Hoffman, Fisher & Heinke Co.

[57] ABSTRACT

A self-unloading centrifuge for use in a metal finishing process which comprises a drum 10 having a perforate cylindrical sidewall 10*a*, supported for rotation about a vertical axis by a support base 19 and a driving arrangement 12 for rotating the drum. A tilt mechanism 36 is operative to engage and rotate the drum about a substantially transverse axis, spaced laterally from the center axis of the drum in order to discharge the processed parts. Clamping devices 30 are operative to decouple the drum from its driving arrangement prior to unloading and are operative to recouple the drum after reloading. Top and side covers 140, 120, 122, 126 enclose the drum when in its operating position and open as the drum moves to its unloading and/or loading position.

18 Claims, 7 Drawing Figures

SELF-UNLOADING CENTRIFUGE

DESCRIPTION

Technical Field

The present invention relates generally to metal finishing processes and in particular to a self-unloading centrifuge for washing, drying and/or coating parts during or after a metal finishing process.

Background Art

Metal finishing processes such as cleaning, phosphating, chemical brightening, plating etc. often include washing, drying and/or coating steps. Various methods and apparatus are used to perform these process functions. A device known in the industry as a centrifuge or "spinner" is an example of one such apparatus.

A commercially available centrifuge generally comprises a drum mounted within an enclosure and a suitable drive motor for rotating the drum. In many commercially available units, the drum is manually loaded and unloaded by an operator. Typically, the parts to be processed are contained and carried within a perforate basket that is transported by a conveyor system or hoist. The operator lowers the entire basket into the drum and releases the hoist from the basket. An access cover is usually closed to cover the drum and the motor energized to rotate the drum. When the centrifuge is used as a dryer, heated air is usually directed into the interior of the drum as it rotates to enhance drying. At the conclusion of the operating cycle, the hoist is reattached to the parts basket and the parts basket is then lifted out of the unit. A separate basket unloading step is then required to transfer the processed parts from the basket to a suitable container.

With commercially available centrifuges, considerable operator effort and time is expended in loading and unloading the unit. Centrifuges have been suggested that include apparatus that facilitates unloading but it is believed that none of these prior suggested units have been totally successful.

DISCLOSURE OF THE INVENTION

The present invention provides a new and improved centrifuge that includes a self-unloading mechanism.

In a preferred embodiment, the centrifuge comprises a support base upon which a drum is rotated and a driving arrangement for rotating the drum about a substantially vertical axis. At the conclusion of an operating cycle, a tilt mechanism engages the drum and translates it to a dump position at which the drum discharges its contents into a suitable container. After unloading, the drum is preferably conveyed to a load position at which it is refilled with parts to be processed. The loaded drum is then returned to its operating position by the tilt mechanism.

Although a centrifuge construction in which the drum and the driving arrangement remain connected during drum unloading is contemplated by the present invention, in the preferred and illustrated embodiment, the drum is decoupled from the driving arrangement prior to the unloading step. According to this embodiment, the driving arrangement is rigidly mounted to the support base and includes a drive motor rotatably connected to a spin plate. During an operating cycle, the drum is frictionally coupled to the spin plate so that rotation of the spin plate produces attendant rotation in the drum. A suitable friction material, such as rubber, is placed on the driving surface of the spin plate to enhance the frictional coupling between the plate and the drum. Clamping devices, engageable with a peripheral, radial flange mounted near or at the bottom of the drum hold and maintain the drum against the spin plate.

To unload the contents of the drum, the clamping devices are actuated to release the drum from the spin plate. The tilt mechanism engages and lifts the drum from the plate by rotating about a transverse axis through an arc greater than 90° so that the drum is overturned to dump its contents. Once empty, the tilt mechanism, preferably pivots the drum to a load position at which the drum is refilled with parts to be processed. After loading, the tilt mechanism lowers the drum onto the spin plate and the clamping devices are energized to couple the drum to the plate. The drive motor is then energized to rotate the drum.

The tilt mechanism preferably comprises a tilt frame engageable with a radially extending, circumferential flange mounted a predetermined distance above the bottom of the drum. The tilt frame is supported for pivoting movement by a pair of spaced rack assemblies mounted to the support base which rotatably support a transverse drive shaft. Drive gears mounted at opposite ends of the shaft engage racks slidably mounted within the rack assemblies. Reciprocating motion in the racks produces rotation in the drive shaft and hence rotates the tilt frame through a predetermined arc depending upon the longitudinal movement of the racks. In the preferred embodiment, actuators, preferably double acting, fluid pressure operated cylinders, are connected to, and drive the racks. A suitable fluid pressure control system controls the fluid communication between a source of pressurized fluid and the actuators and hence controls the operation of the tile frame.

According to a feature of the invention, top and side covers completely enclose the drum and operating mechanism when the drum is in its drying position. According to this feature, certain of the covers are pivotally mounted and open to allow the drum to travel to its unload position. In particular, a pair of top covers overlie the drum and are raised by the rack-operating cylinders as the drum is moved to its unload position. A side panel is attached to the tilt frame so that it tilts outwardly along with the drum.

The disclosed centrifuge can perform a variety of functions as part of an overall metal finishing process. For example, the disclosed apparatus can be used as a centrifugal dryer in which parts, still wet after a washing or solvent cleaning step, are loaded into the drum and then spun to remove the excess liquid or even dried. With little or no modification, the disclosed apparatus can be used to "de-oil" parts immediately after a machining step to remove excess cutting oil prior to a cleaning step. When used in this application, the apparatus not only simplifies and reduces the cost associated with a subsequent cleaning step, by reducing the amount of cleaning solvent needed, it also can be used to recover cutting oil from the parts that would otherwise be lost during the cleaning step. With minor modification, the disclosed centrifuge can also be used as a washing or coating machine. In this application, a spray nozzle is suitably mounted to the centrifuge and oriented so that the fluid spray is directed towards the interior of the drum. When a solvent such as water is sprayed into the drum as it rotates, the centrifuge operates as a washer providing a method for cleaning parts during a manufacturing process. When a degreasing solvent is used, much of the solvent "spun-off" the parts can be recovered for reuse. To use the apparatus as a coating machine, a suitable fluid coating such as paint, is sprayed onto the parts as the drum rotates. The centrifugal force generated by rotation, causes the parts to retain a uniform coating thickness.

In the exemplary embodiment, heated air is directed into the interior of the drum to enhance drying, when the centrifuge is used as a dryer or coating machine. To achieve this feature, a heat source, for example one or more steam coils, is mounted within the enclosure. Air, blown through the coils is channeled into the drum by way of baffling formed in the topcovers.

The disclosed self-unloading centrifuge greatly simplifies the washing, drying and/or coating steps in a metal finishing process. Unlike many prior art devices, the disclosed unit eliminates the tedious task of lowering and raising a parts basket into and out of the drum. Parts are directly loaded into the drum and are unloaded automatically into a suitable container by tilting the drum to an unload position.

Additional features and a fuller understanding of the invention will be obtained in reading the following detailed description made in connection with the accompanying drawings.

BEST MODE FOR CARRYING OUT THE INVENTION

Figure 1:
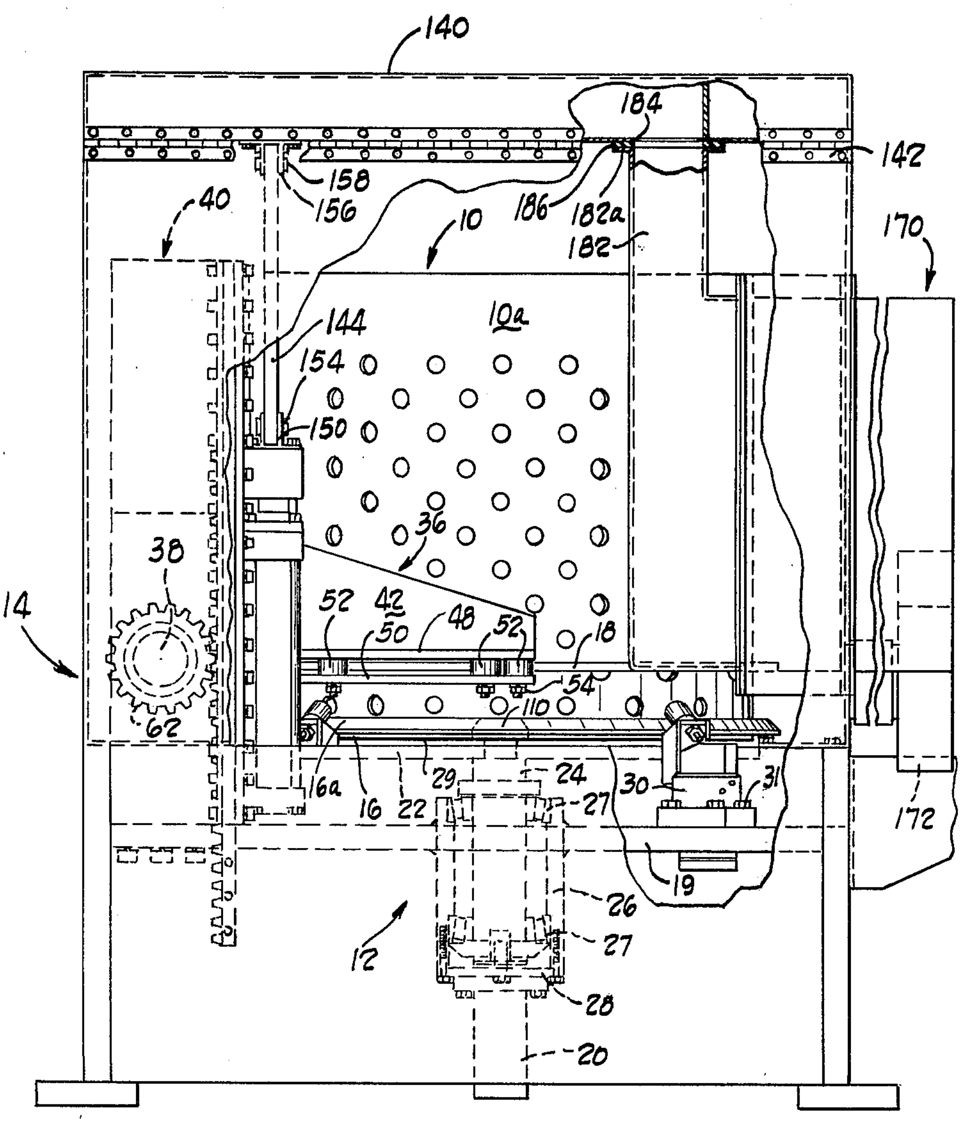
FIG. 1 is side view of a centrifuge apparatus constructed in accordance with the preferred embodiment of the invention, with portions removed to show interior detail.

FIG. 1 illustrates the overall construction of a self unloading centrifuge constructed in accordance with the preferred embodiment of the invention. The centrifuge comprises a drum 10 that forms a receptacle for parts to be processed, a drive system 12 for rotating the drum 10 and a drum tilt mechanism, indicated generally by the reference character 14 for translating the drum 10 from the position shown in FIG. 1 to load and unload positions.

Figure 2:
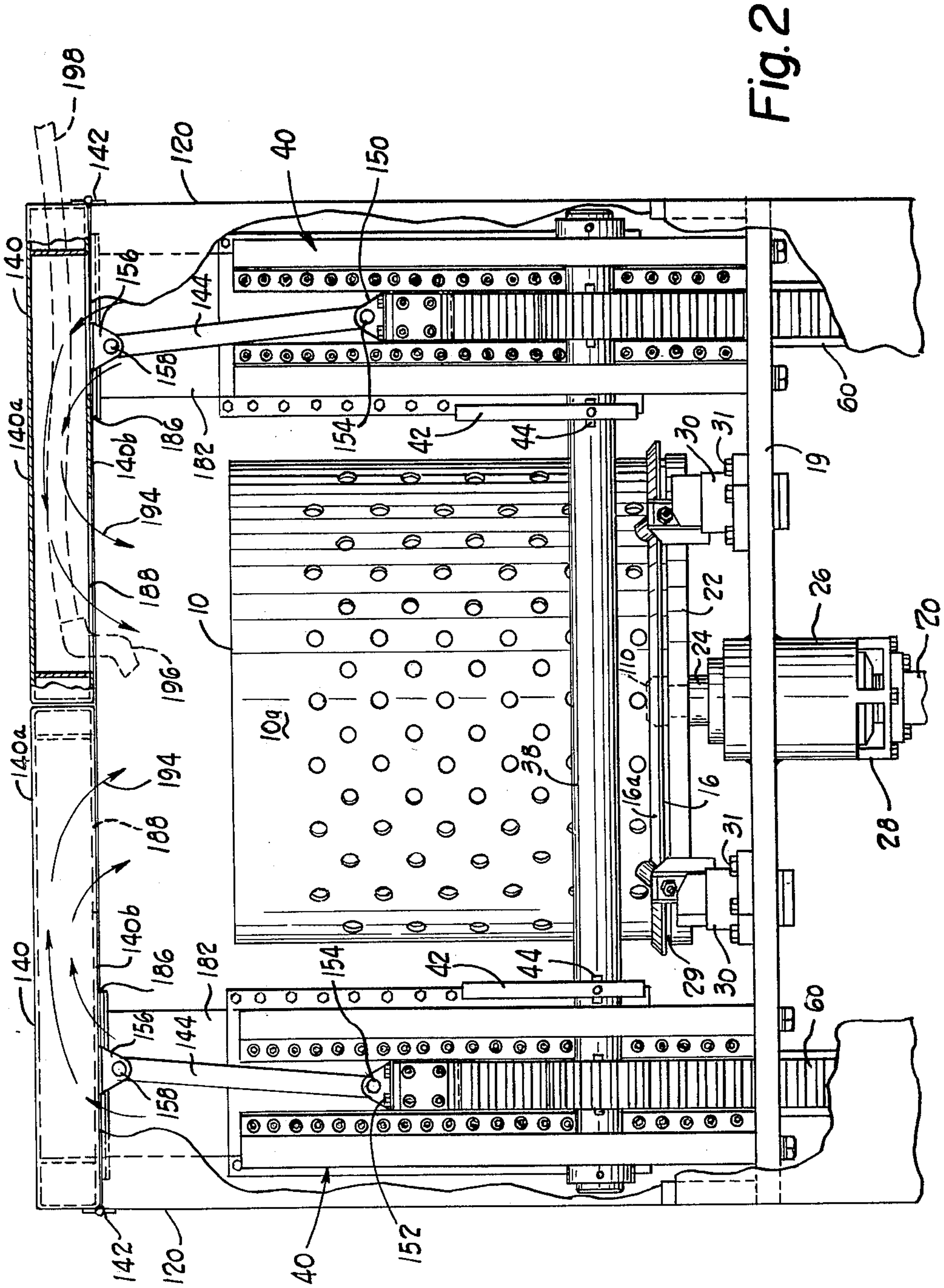
FIG. 2 is a front elevational view of the apparatus, with portions removed to show interior detail.

The drum 10 is preferably an upstanding cylinder shaped structure having a perforate sidewall 10*a*. Referring also to FIG. 2, a flange 16 extends radially from the bottom of the drum 10 and includes a chamfered surface 16*a*. Another radial flange 18 is fastened, preferably welded to the circumference of the drum 10 a predetermined distance above the flange 16. An apertured wire mesh or sheet metal basket (not shown) is fastened to the inside of the drum 10 to prevent small items being processed from falling through the perforations in the sidewall 10*a*.

The drive system 12 is mounted to rigid support base 19 and is operative to rotate the drum 10 when the drum is located in the position shown in FIG. 1. The drive system 12 comprises a suitable drive motor 20 that is connected to a spin plate 22 by a drive shaft 24. The drive shaft 24 extends through the support base 19 and is rotatably supported by a bearing housing 26 that includes a pair of tapered roller bearings 27 (shown only in FIG. 1). A mounting bracket 28 rigidly mounts the drive motor to the bottom of the bearing housing 26. A friction material 29, such as rubber, is mounted to the top of the spin plate so that when the drum 10 is placed on the spin plate 22, the drum and drive system are frictionally couple.

Figure 3:
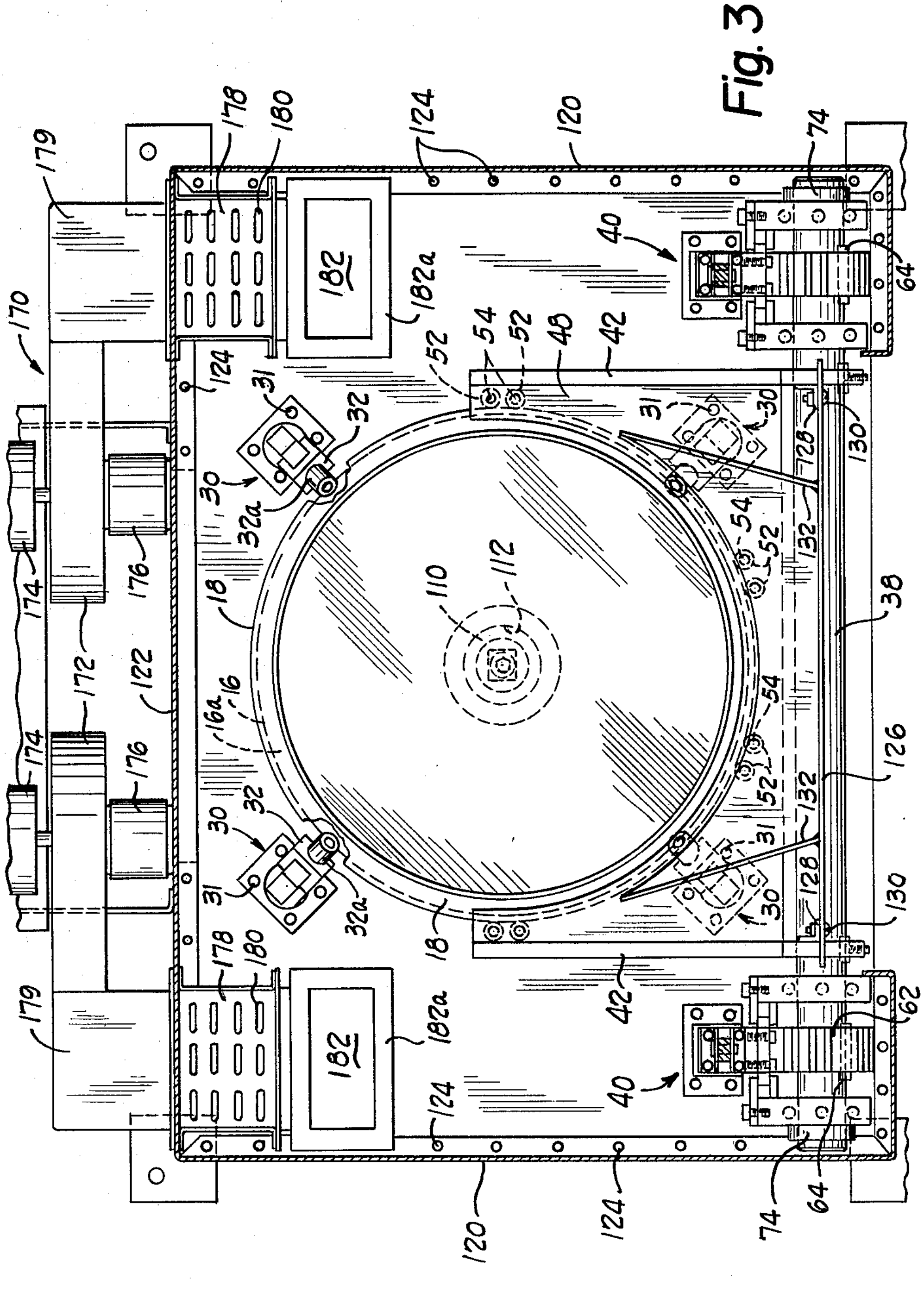
FIG. 3 is a top plan view of the apparatus, with top covers removed to show the interior of the apparatus.

During rotation, the drum 10 is preferably held against the spin plate 22 by clamping devices 30 positioned at spaced intervals around the base of the drum and bolted to the base plate 19 by fasteners 31. Referring also to FIG. 3, each clamping device 30 preferably comprises a fluid pressure operated clamp-down cylinder available from Interpack Company which includes a roller bracket 32 that mounts a roller 32*a* engageable with the chambered surface 16*a* of the flange 16. When the device 30 is actuated to engage the drum, the roller bracket 32 is rotated toward the drum 10 and is driven downwardly to engage the surface 16*a*, thus clamping the drum 10 to the spin plate 22 (as shown in FIGS. 1–3). When the clamping device 30 is actuated to release the drum, the roller bracket is raised and reverse rotated so that the roller 32*a* disengages the chambered surface 16*a* and clears the periphery of the flange 16.

Figure 4:
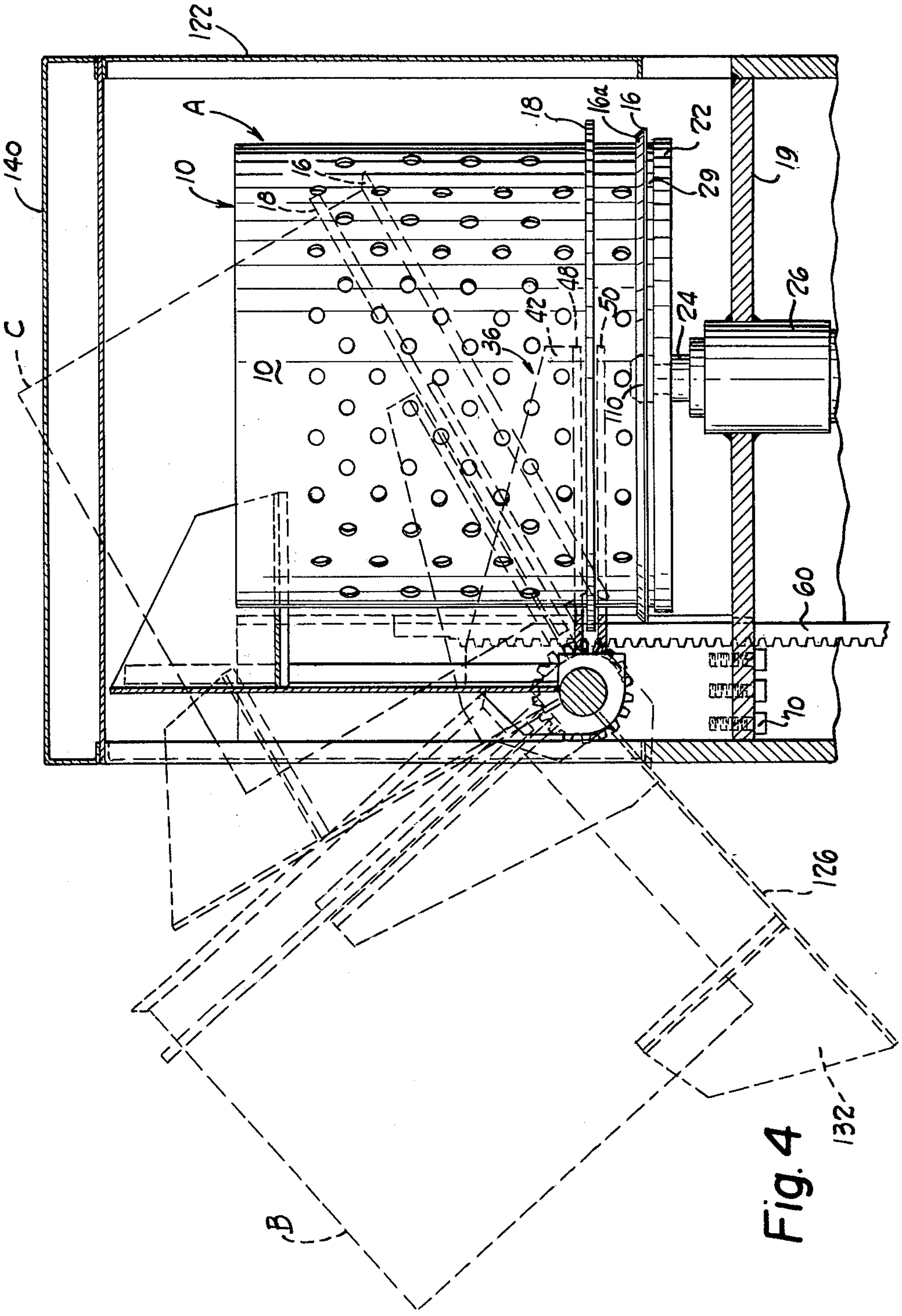
FIG. 4 illustrates various positions of a parts drum that forms part of the present invention with portions removed for clarity.

When the drum 10 is released by the clamping devices 30, the drum tilt mechanism 14 is operative to lift the drum 10 from the spin plate 22 and rotate it about a substantially horizontal axis to a dump position (shown in phantom in FIG. 4 and indicated by the reference character "B"). The tilting mechanism comprises a tilt frame, indicated generally by the reference character 36 in FIG. 1, attached to a drive shaft 38 (shown best in FIG. 2) that is rotatably supported by a pair of spaced rack assemblies 40, which define a substantially transverse axis of rotation for the drive shaft 38. In the preferred embodiment the axis of rotation is located above the base of the drum 10 and laterally spaced from its center axis.

Referring in particular to FIGS. 1–3, a pair of spaced actuating arms 42 are fixed to the drive shaft 38 at spaced locations and are rotatably coupled to the shaft by keys 44. The arms 42 are in turn connected to a yoke-like saddle formed by spaced, upper and lower plate members 48, 50. A plurality of rollers 52 are rotatably mounted between the plate members 48, 50 by suitable fasteners 54. The inner edges of the plate members 48, 50 conform to the periphery of the cylindrical wall 10*a* and ride above and below the flange 18. Preferably, the plate members 48, 50 are supported in close proximity, but do not contact, the wall 10*a* or the flange 18 when the drum 10 is in its drying position.

As seen in FIG. 1, rotation of the drive shaft 38 produces attendant, pivotal motion in the tilt frame 36. As the plate members 48, 50 pivot, the lower plate member 50 abuttably engages the lower surface of the flange 18 and raises the drum off the spin plate 22 (the clamping devices 32 are released prior to motion in the tilt frame).

Figure 5:
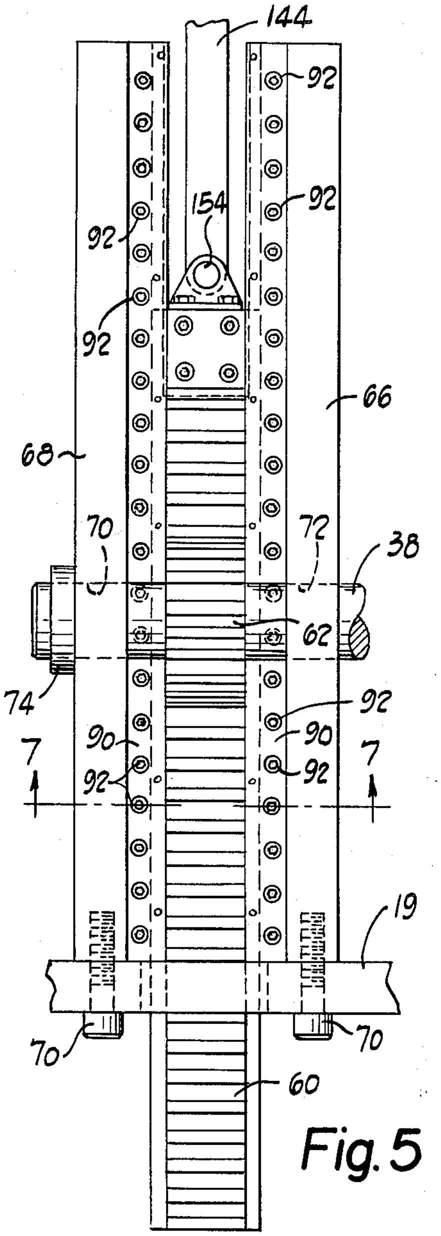
FIG. 5 is a front elevational view of a rack assembly forming part of the apparatus.
Figure 6:
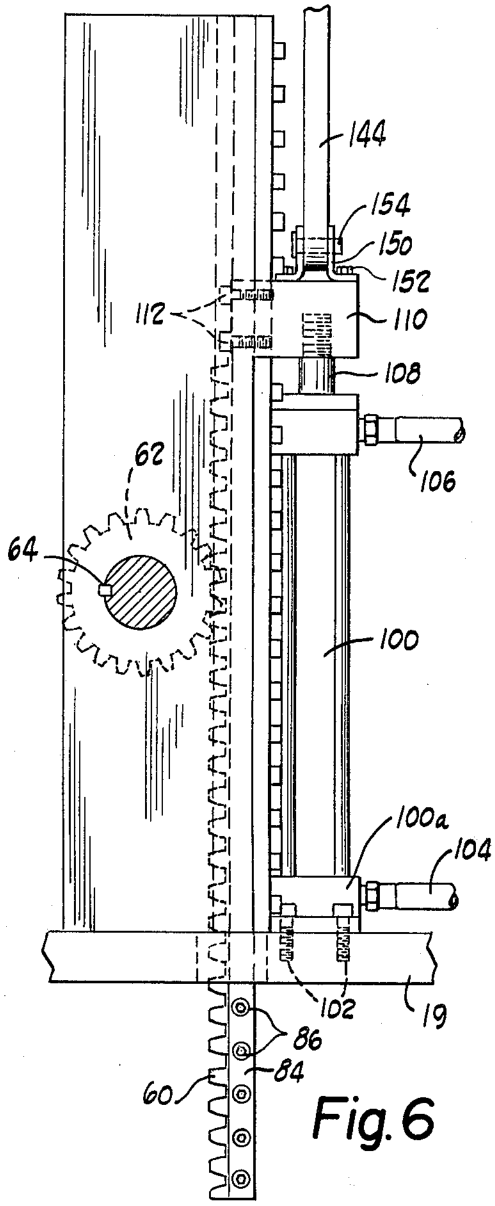
FIG. 6 is a side, elevational view of the rack assembly shown in FIG. 5.
Figure 7:
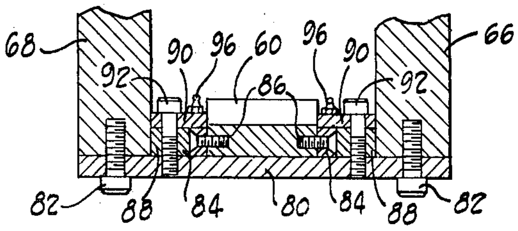
FIG. 7 is a sectional view as seen from the plane indicated by the line 7—7 in FIG. 5.

The drive shaft 38 is rotated and counter-rotated through a predetermined arc by the rack assemblies 40. Referring also to FIGS. 5–7, each rack assembly 40 slidably mounts a rack 60 that engages a spur gear 62 mounted at opposite ends of the drive shaft 38 and rotatably coupled to the shaft by keys 64 (shown best in FIG. 3). Referring in particular to FIGS. 5-7, each rack assembly comprises relatively heavy, rigid inner and outer side plates 66, 68 respectively, that are fastened to the base plate 19 by a plurality of cap screws 70. The drive shaft 38 extends through aligned apertures 72 formed in each side plate 66, 68. The outer side plate 68 mounts a bushing 74 that rotatably supports the drive shaft 38.

As seen best in FIG. 7, the rack 60 is slidably captured between the side plates 66, 68 by a trackway. In particular, a back plate 80 extends between and is fastened to the rear edges of the side plates 66, 68 by a plurality of cap screws 82. A pair of runners 84, preferably formed from a bearing material such as brass, are fastened to opposite side edges of the rack 60 by a plurality of counter sunk fasteners 86. A pair of spacing blocks 88 constructed of a bearing material are positioned between the side plates 66, 68 and the runners 84. A pair of retaining plates 90 also constructed of a bearing material, are positioned over both the spacer blocks 88 and the runners 84 and are held in position by a plurality of fasteners 92 that extend through both the retaining plates 90 and the spacer blocks 88 and threadly engage the back plate 80. The rack 60 is periodically lubricated through grease fittings 96 mounted at spaced locations along the retaining plates 88.

As seen in FIGS. 5 and 6, the rack 60 is reciprocally moved in a vertical direction by an actuator 100, preferably a fluid pressure operated, double acting cylinder. As shown best in FIG. 6, the cylinder 100 is mounted vertically behind the back plate 80. The bass 100*a* of the cylinder is fastened to the support plate 19 by a plurality of cap screws 102. Fluid conduits 104, 106 communicate fluid pressure to the head and rod ends of the cylinder 100, respectively. The selective communication of fluid pressure to the cylinder 100 raises and lowers an actuating rod 108. The rod 108 is threadedly connected to an attachment block 110 which in turn is bolted to the top of the rack 60 by a plurality of cap screws 112, so that vertical, up and down motion in the rod 108 produces attendant vertical motion in the rack 60. The upper portion of the back plate 80 is slotted to enable the connection between the attachment block 110 and the rack 60. As seen in FIG. 6, upward movement in the actuating rod 108 produces counterclockwise rotation in the spur gear 62 and hence the drive shaft 38, whereas downward movement produces clockwise motion in the drive shaft.

FIG. 4 illustrates the operating and dumping positions of the drum 10, labeled "A" and "B", respectively. In position "A" (the operating position), the drum 10 is clamped to the spin plate 22 by the clamping devices 30 (not shown in FIG. 4). In this position, the rack actuating cylinder 100 is fully retracted and the rack 60 is in its lower most position (also shown in FIG. 6). To unload the drum, the rack cylinders 100 are extended by communicating fluid pressure to the head ends of the cylinder thus raising the rack 60 and producing clockwise rotation in the drive shaft 38. The rotation of the drive shaft pivots the tilt frame 36 towards the left as viewed in FIG. 4. As the tilt frame rotates, the lower plate member 50 engages the flange 18 and raises the drum 10 off the spin plate 22 and carries it to position "B", the dump position. Throughout the movement, the drum 10 is held by the upper and lower plate members 48, 50 of the tilt frame 36.

In order to facilitate the proper positioning of the drum 10 on the spin plate 22, a centering pilot 110 is mounted to the end of the shaft 24. The base of the drum 10 includes a centrally positioned pilot aperture 112 (shown in FIG. 3) sized to receive the pilot 110. The pilot includes an upper, frustal conical surface to facilitate the entry of the pilot into the aperture.

Referring to FIGS. 2-4, the drum 10 and associated operating mechanism are fully enclosed by sheet metal covers when the drum is in its operating position. Side and back covers 120, 122 are rigidly attached to the base plate 19 by a plurality of fasteners 124. A front panel 126 is attached to the tilt frame 36 by L-shaped brackets 128 that are welded to inner sides of the actuating arms 42 and fastened to the front plate 126 by fasteners 130. A pair of plates 132, welded to the back of the front plate 126, extend from the rear of front plate to the outer surface of the drum 10 and form a chute for guiding parts during drum unloading. As shown best in FIG. 2, a pair of top covers 140 are pivotally attached to the side covers 120 by hinges 142. Actuating links 144 extend between the top of the rack assembly, specifically the actuating block 110, and the bottom of the covers 140. Referring also to FIG. 6, a clevis 150 is bolted to the top of the actuating block 110 by a plurality of threaded fasteners 152. The lower end of the link 144 is held in the clevis 150 by a pin 154. The upper end of the link 144 is similarly held to the bottom surface of the cover 140 by a clevis 156 and associated pin 158. With the disclosed construction, the top covers 140 are raised whenever the rack cyliners 100 are extended and thus the covers will open whenever the drum 10 is tilted to its unload position. Because the front panel 126 is attached to the tilt frame, it to will pivot outwardly whenever the drum is driven to its unload position, as shown in FIG. 4.

In accordance with a feature of the invention, heated air is directed to the interior of the drum, when the centrifuge is used to dry parts after a washing or coating step. Referring to FIG. 3, a blower assembly 170 is suitably fastened to the back panel 122 and includes a pair of blowers 172 and associated drive motors 174. In the preferred configuration, the blowers 172 draw air from of the dryer through an inlet 176 mounted concentric with an aperture formed in the back panel 122. The air is conveyed to heating chambers 178 mounted at the rear corners of the centrifuge by ductwork 179 mounted on the back panel 122. The heating chambers 178 include a source of heat such as a steam coil 180 disposed in the air flow path. After leaving the heating chamber 178, the heated air travels through a duct 182 mounted in front of the heating coil 180 (see also FIG. 2) and is channeled into the top covers 140.

As seen in FIG. 2, each top cover defines an air space between upper and lower cover members 140*a*, 140*b*, respectively. When the covers are closed, an aperture 184 (shown in FIG. 3) formed in each bottom cover member 140*b* is aligned with the associated duct 182. The top of each duct 182, terminates in a flange 182*a*. A gasket mounted 186 on the top, confronting surface of the flange 182*a* sealingly engages the undersurface of the cover member 140*b* when the top cover 140 is closed, thus establishing a direct air communication between the duct 182 and the air space. A second aperture 188 (indicated in FIG. 2) formed in the lower cover member 140*b* is located so that it is positioned directly over the mouth of the drum 10 when the covers 140 are closed. During the drying cycle, the top covers assume the position shown in FIG. 2 and the blower motors 174 are energized to rotate the blowers 172. During blower operation, air is drawn from the interior of the enclosure through the inlet openings 176, conveyed to the heating chambers 178 and heating coils 180 and then directed to the interior of the barrel 10 by the ducts 182 and the top covers 140. The air circulation path through the top covers 140 is indicated by the arrows 192.

In an alternate embodiment, the disclosed centrifuge is fitted with a means for spraying a fluid into the drum 10. Apparatus for achieving this feature is illustrated in phantom in FIG. 2. Preferably, the apparatus comprises a spray nozzle 196 mounted to one or both top covers 140. For purposes of explanation, only one nozzle is illustrated. A fluid supply conduit 198 extends from the nozzle 196 to a suitable source of fluid (not shown). With this construction, the centrifuge can be used as a washer or coating machine. When used as a washer, water or a suitable degreasing solvent is injected into the interior of the drum 10 by the nozzle 196. Rotation of the drum, spins off the solvent and dissolved oil, dirt, etc. To use the centrifuge as a coater, a coating such as paint is sprayed into the drum by the nozzle 196. Rotation of the drum spins out the excess coating leaving a uniform coating thickness on the parts. In both applications, the parts can be dried within the centrifuge after washing or coating, by use of the heaters described above.

Although not illustrated, in actual operation, shielding is placed around the drum 10, the rack assemblies 40 and other components of the apparatus, to protect the operating mechanisms from the liquids and/or particles thrown off by the drum 10 during rotation. The extent and manner of shielding will depend on the use to which the centrifuge is put. For example, if used as a dryer, minimal shielding would be required to protect the rack assemblies 40 and clamping devices 30. In addition to shielding, a drainage system, possibly integrally formed with the shields would also be provided to conduct the liquid thrown off by the drum, during rotation, to a drain or other suitable reservoir.

The disclosed contrifuge greatly expedites the metal finishing process for it eliminates the tedious operator task of loading and unloading the drum. According to the preferred operating method, the drum 10 is translated to a load position after it has been unloaded and prior to repositioning atop the spin plate 22. The load position is shown in phantom in FIG. 4 and is denoted by the reference character "C". In the preferred embodiment, the load position is intermediate the unload and operating positions (labeled "B" and "A"). In the load position the mouth of the barrel extends outside of the side covers and is oriented to receive parts from a suitable loading mechanism such as a hopper or conveyer chute. After loading, the rack assemblies are energized to return the loaded drum 10 to the spin plate 22.

The present invention contemplates a variety of driving elements and mechanisms for effecting rotation in the drum 10, the clamping of the drum to the spin plate 22, and rotation of the tilt frame 36. A multitude of servo mechanical devices such as servo motors, continuous running motors and transmissions, etc. could be used to operate the elements of the drying apparatus. In the disclosed embodiment, fluid pressure operated devices are preferred for they provide a simple, yet effective centrifuge operation. In accordance with this embodiment, the drive motor 22 is a fluid motor and the clamp-down cylinders 30 as well as the rack assemblies 40 are all fluid pressure operated. With this construction, a single source of fluid pressure (not shown) and a suitable fluid pressure controlling system for controlling the communication of the source pressure to the fluid motor 22, the clamp-down cylinders 30 and the rack actuators 100 are all that is required. Separate power sources for the various operating mechanisms are unnecessary.

With the use of a fluid motor, the drum 10 can be rotated in either direction and its rotational speed can be easily varied. Moreover, the acceleration and deceleration rates for the drum can be tailored for a particular application. It should be noted that electric motors with appropriate electrical controls can also provide this operational flexibility, but although the use of electric motors is contemplated by the present invention, it is believed that the configuration illustrated and described is currently more economical.

In the disclosed construction, the drum 10 is separated or decoupled from the driving arrangement prior to unloading. The decoupling of the drum from the drive motor simplifies the operating mechanism and reduces the lifting weight of the drum 10. It should be recognized, however, that arrangements in which the drive system remains coupled to the drum and both are rotated to the unload position are also contemplated by the present invention.

It should be appreciated, that the disclosed centrifuge can perform a variety of metal finishing and related tasks. For example, it can be used as a dryer, washer, solvent degreaser, and coater with little or no modification. The shielding and drum rotational speed are adjusted to accommodate the various uses.

Although the invention has been described with a certain degree of particularity, it is understood that various changes can be made to it by those skilled in the art without departing from the spirit or scope of the invention as described and hereinafter claimed.

I claim:

1. A self-unloading, centrifuge, comprising:

(a) a support base;

(b) an upstanding, open top drum including a perforate cylindrical wall supported for rotation about a substantially vertical axis;

(c) drive means for imparting rotation to said drum including releasable coupling means for operatively connecting said drum to said drive means;

(d) drum unloading means including drum tilting apparatus engageable with said drum and operative to pivot said drum about a substantially horizontal axis, laterally spaced from the center axis of said drum, after said coupling means is released.

2. A self-unloading, centrifuge, comprising:

(a) a support base;

(b) a drum forming a receptacle for parts to be dried, including a cylindrical perforate wall;

(c) drum drive means for rotating said drum about a substantially vertical axis;

(d) drum tilt means mounted for pivotal motion about a transverse axis vertically spaced above the bottom of said drum and laterally spaced from said vertical axis, said tilt means engageable with a portion of said drum;

(e) said tilt means pivotally supported by a pair of spaced rack assemblies, each assembly including a rack operatively engaging an associated drive gear forming part of said tilt means, said racks reciprocally movable by a rack operating means to produce rotative movement in said tilt means thereby translating said drum between operating and unloading positions.

3. The apparatus of claim 2 wherein said racks and rack operating means are operative to tilt said drum to a load position intermediate said unloading and operating positions.

4. The apparatus of claim 2 wherein said rack operating means comprises fluid pressure operated actuators and said drive means comprises a fluid operated motor.

5. The apparatus of claim 2 wherein said drive means includes a motor and a means for releasably coupling said motor to said drum.

6. The apparatus of claim 5 wherein said releasable coupling means comprises a drive plate rotatably driven by said motor and clamping means for clamping said drum to said drive plate to frictionally couple said drum to said drive plate.

7. The apparatus of claim 6 further comprising friction material disposed on said drive plate to enhance the friction coupling between said drum and said drive plate.

8. The apparatus of claim 2 further comprising drive coupling means operative to rotatably couple said drive means to said drum when said drum is in its operating position and operative to decouple said drum when said drum is tilted to to its unload position.

9. A self-unloading, centrifuge, comprising:

(a) a support base;

(b) an open top, upstanding drum including a perforate cylindrical wall;

(c) drive means for rotating said drum about a substantially vertical axis, said drive means including a motor and drive plate mounted to said support base;

(d) drum clamping means mounted to said base and operative to frictionally clamp said drum to said drive plate when said drum is in its operating position;

(e) a pair of spaced rack assemblies mounted to said support base, each assembly including a reciprocally movable rack;

(f) drive shaft means extending transversely between and pivotally supported by said rack assemblies including drive gears operatively engaged by said racks so that reciprocation of said racks produces rotative motion in said shaft means; and, (g) a drum tilt frame attached to said drive shaft and engageable with an annular flange on said drum such that rotation of said drive shaft pivots said tilt frame and translates said drum along a curvilinear path from an operating position to an unload position.

10. The apparatus of claim 8 further including side and top covers for enclosing said drum when said drum is in its operating position and further including cover raising means for opening said top covers to allow said drum to pivot to its unload position.

11. The apparatus of claim 8 wherein said rack assemblies include fluid pressure operated actuators for reciprocally moving said racks.

12. The apparatus of claim 8 wherein said drum clamping devices and drive motor are fluid pressure operated.

13. The apparatus of claim 8 further comprising a source of heated air including means for directing said heated air towards the interior of said drum.

14. The apparatus of claim 8 or 12 further comprising a spray nozzle and associated supply conduit, for injecting a fluid into the interior of said drum.

15. The apparatus of claim 8 wherein said drum includes another annular flange located near the bottom of said drum and said clamping means, includes roller assemblies including rollers translatable into rolling engagement with said other flange.

16. The apparatus of claim 12 wherein said means for directing heated air comprise top covers that define a flow path of heated air from said source to said drum, when said covers are in a closed position.

17. The apparatus of claim 9 wherein said cover raising means for opening said top covers is operatively connected to said rack assemblies.

18. A self-unloading, centrifuge, comprising:

(a) a support base;

(b) open top drum for receiving and confining articles to be processed;

(c) drive means for rotating said drum about a substantially vertical aixs, said drive means including a motor and drum driving member mounted to said support base;

(d) fluid pressure operated drum clamping means mounted to said base including rollers engageable with a portion of said drum and operative to rotatably couple said drum to said drum driving member, when said drum is in its operating position;

(e) a pair of spaced, fluid pressure operated rack assemblies mounted to said support base, each assembly including a reciprocally movable rack;

(f) drive shaft means extending transversely between and pivotally supported by said rack assemblies, including drive gears operatively engaged by said racks so that reciprocation of said racks produces rotative motion in said shaft means about a substantially horizontal axis; and (g) a drum tilt frame attached to said shaft means including means for engaging said drum, such that upon rotation of said shaft means, said tilt frame engages said drum and rotates said drum through a predetermined arc, about said axis.

* * * * *